Aug. 10, 1965 W. E. MOODY 3,199,277
ROTARY POWER LAWN MOWER WITH GRASS CATCHER
Filed Jan. 8, 1964
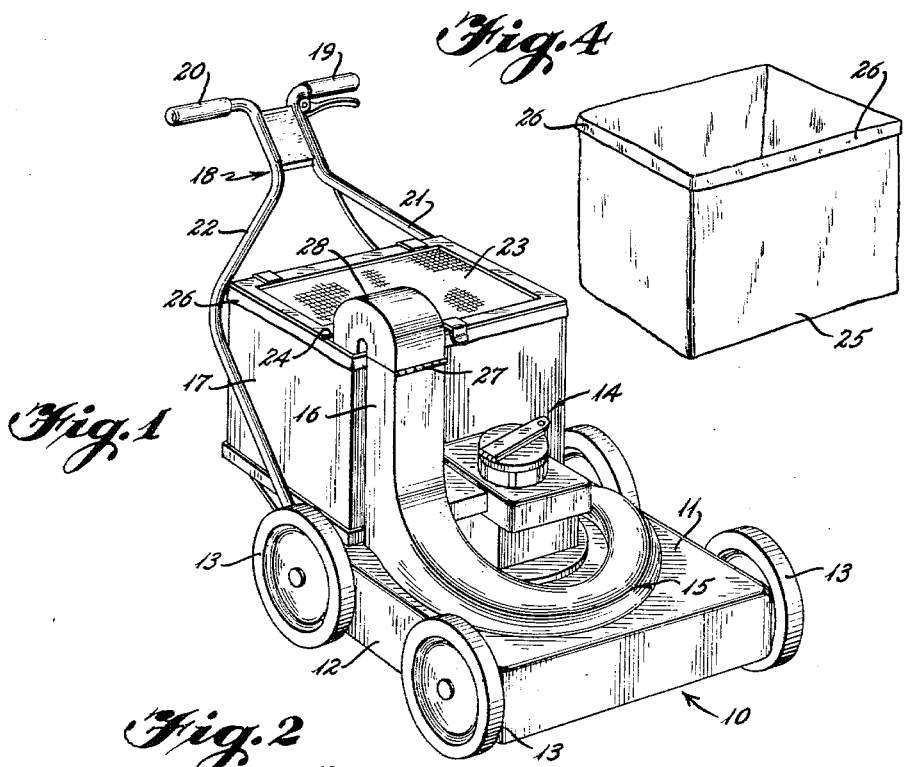
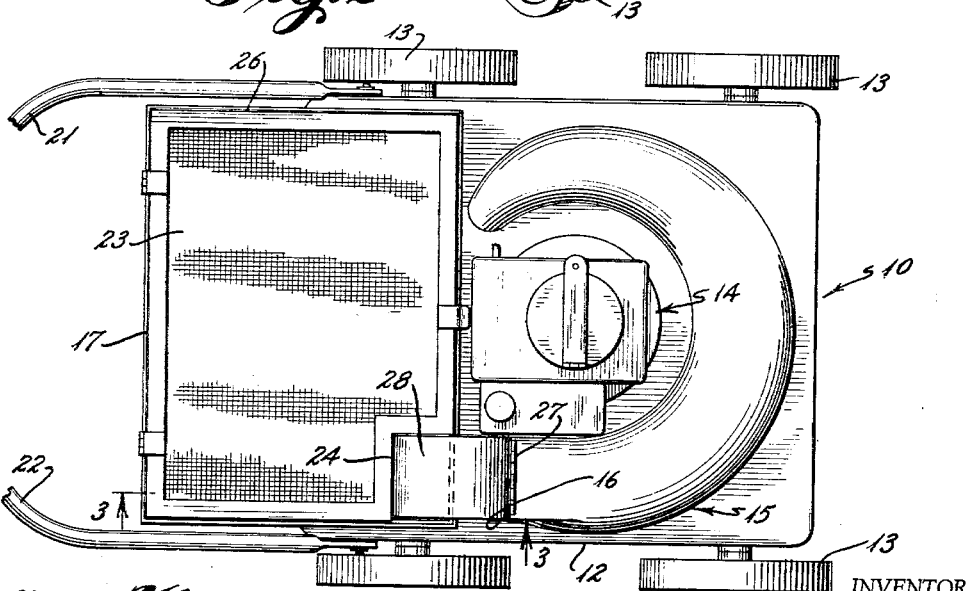
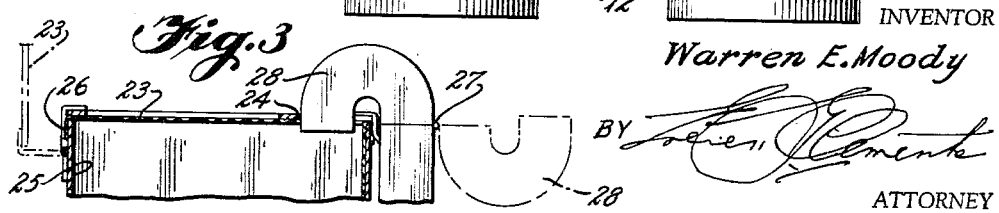
INVENTOR
Warren E. Moody
BY
ATTORNEY United States Patent Office 3,199,277
Patented Aug. 10, 1965

3,199,277
ROTARY POWER LAWN MOWER WITH
GRASS CATCHER
Warren E. Moody, 95 Fiesta Way, Fort Lauderdale, Fla.
Filed Jan. 8, 1964, Ser. No. 336,421
7 Claims. (Cl. 56—25.4)

This invention relates to a grass catching device for a power lawn mower of the rotary type. The invention relates particularly to such a device having a disposable type bag to be used in connection therewith.

The invention also includes a box or casing carried on the deck of the lawn mower, preferably rearwardly thereon adjacent and/or between two members of a guiding handle, and a disposable bag adapted to be placed in and supported in part by upper edge portions of the box.

An object of the invention is the provision of a spirally ascending grass cutting delivery conduit within the deck of the rotary type lawn mower which terminates in a vertical stack through an opening in the deck leading to a box placed rearwardly of the power means.

A further object of the invention is the provision of a movably mounted U-shaped connection or goose-neck at the upper end of a delivery conduit and stack that can be moved into operative position to discharge grass cuttings into a bag supported within a box adjacent said stack and away from said operative position to permit easy removal of the bag from the box.

An additional object of this invention is a hingedly mounted goose-neck at the fill end of a stack and riser connected to an upwardly directed opening in a spirally ascending conduit formed in the deck of the lawn mower.

These and other objects will be apparent when considering the following specification in connection with the accompanying drawings, which together form a complete disclosure of this invention.

In the drawings:

FIG. 1 is an axonometric view of my improved rotary type lawn mower and grass catcher device constructed in accordance wtih my invention;

FIG. 2 is a plan view of a power mower including the device of this invention;

FIG. 3 is a fragmentary section on the line 3—3 of FIG. 2, and showing parts in dotted line positions; and FIG. 4 is an axonometric view of a disposable bag for use with the grass catcher of this invention.

In the drawings, the numeral 10 refers to a rotary power type lawn mower having a top wall or deck 11, from which depends a guard apron 12. Ground supporting wheels 13 are usually adjustably connected to the apron. The mower 10 is shown as powered by an internal combustion motor 14. The parts thus far described are conventional and need no further description. The motor 14 drives a horizontally rotatable blade, not shown, below the deck 11 within the confines of the apron 12. The blade is of a usual type designed to direct a whirling current of air upwardly away from the ground, as for example is shown in the patent to Arrington 2,720,070, isssued October 11, 1955, or in the patent to Franham 2,942,396, issued June 28, 1960. In other words, it is essential that in operation the blade clips the grass or other ground cover in accordance with the vertical adjustment of the wheels and in so doing creates a strong upward air current tending to carry the clippings away and up the stack, later to be described, the apron 12 preventing side discharge.

As shown the deck 11 is formed with a downwardly facing channel or conduit 15 arranged concentrically with the drive shaft of the motor 14 and has a gradually ascending top wall overlying the fan blade, which spiral wall terminates in a riser or stack 16, through an opening not shown, in the deck, adjacent or alongside the motor 14. The upper free end of this stack 16 terminates at a point slightly below the upper edge of a box 17.

As is also usual, the mower 10 is provided with a handle member 18 which has hand grips 19, 20 and is provided with furcations 21 and 22 leading to the mower frame at suitable locations thereon, not shown, whereby the mower may be guided and/or hand propelled as required. The box 17 is preferably placed between the furcations 21, 22, to which it may be attached and is generally rectangular in cross section. This box 17 is provided with a perforate or foraminous cover 23 to permit the free escape of air, and the cover 23 may be hinged in any suitable manner to an upper margin of the box 17. Near one corner of the cover 23 however, there is provided an opening of suitable shape and size to receive the downturned free end of the goose-neck, later described, through which cuttings are to be discharged into disposable bag 25.

The bag 25 may be of a section substantially like that of the box 17, as its function is to be placed in the box 17 with the upper edge thereof folded over, as at 26 to be supported by the box edges so that the cuttings from the mower may be retained therein. This bag 25 may be formed of pliofilm or other suitable material so as to be easily disposable when removed from the box 17.

Pivotally attached as at 27, to the upper free end portion of the stack 16 is a downturned U-shaped or goose-neck stack section 28, shown in operative position in FIG. 1, and in inoperative position in FIG. 3. In the said operative position of the section 28, one leg of the U may extend into or overlay the opening 24 so as to insure that cuttings will be directed into the bag 25 within the box 17. When it is desired to remove the bag from the box the parts may be moved to the inoperative position with the goose-neck as shown in FIG. 3. The cover 23 may then be lifted freely and the bag 25 removed.

Having now described my invention, I desire it to be understood that various modifications may be made within the skill of the art and the scope of the appended claims.

I claim:

1. In a rotary type lawn mower having a generally horizontal deck, ground wheels supporting said deck and power means carried by said deck for rotating a blade below said deck, and handle means for guiding the mower, the improvement comprising a conduit formed in part with said deck leading spirally and upwardly from the deck, said conduit terminating in a vertical stack, a box mounted on said deck rearwardly of said stack, said handle means having furcations and said box being received on said deck between said furcations, a goose-neck section hingedly mounted on the upper end of said stack, said section having its free end portion laterally spaced from said stack and directed into said box.

2. The lawn mower of claim 1, in which said box has a movably mounted cover, an opening in said cover, and said spaced free end portion of said goose-neck extending through said opening in said cover for discharge of cuttings therethrough from said stack.

3. The lawn mower of claim 2 in which the goose-neck section is movably mounted relative to the opening in said covering on the upper end of said stack to engage and secure said cover during use.

4. The structure as defined in claim 2 in which said goose-neck section is hinged to said stack portion and said goose-neck being movable relative to said hinge to move on a horizontal axis from operative position over said opening in said cover to an inoperative position relative thereto.

5. The structure as defined in claim 1 including a disposable bag placed within said box and having its upper edge folded back over the upper edges of the box, said box cover engaging and holding said bag edge and said bag relative to said opening in said cover.

6. A lawn mower comprising a mobile chassis having a generally horizontal deck, means supported by said deck for cutting and propelling grass, handle means having furcations for moving said lawn mower extending on opposite sides thereof, a permanent container having a cover and extending upwardly from the deck between the furcations of said handle, a disposable container mounted in and held open by said permanent container on said deck, and conduit means formed in part with said deck and having a vertical stack portion extending into said disposable container in said permanent container through said cover for the collection of grass cuttings, whereby said handle may be freely moved relative to said permanent container and said disposable container may be freely movable into and out of said permanent container between said furcations.

7. A lawn mower comprising a deck, ground wheels supporting the deck for movement over the ground, a cutting blade rotatably mounted below the deck, power means supported on the deck for rotating the blade, a permanent container also mounted on the deck, a porous cover secured to the container, a vertical conduit opening to the underside of the deck and into the container through the cover, and a disposable container in the permanent container and supported thereby adjacent said cover for receiving cuttings from the conduit.

References Cited by the Examiner

UNITED STATES PATENTS

| | | | |
|---|---|---|---|
| 1,026,081 | 5/12 | Dorais | 232—43.2 X |
| 2,433,945 | 1/48 | Foreman | 220—65 |
| 2,627,155 | 2/53 | Shuler et al. | 56—501 |
| 2,779,146 | 1/57 | Mitchell et al. | 56—25.4 |
| 2,807,126 | 9/57 | Bennett | 56—25.4 |
| 2,809,389 | 10/57 | Collins et al. | 15—347 X |
| 2,910,818 | 11/59 | Beal et al. | 56—202 X |
| 3,049,857 | 8/62 | Shaw | 56—501 |
| 3,118,267 | 1/64 | Shaw | 56—255 X |

FOREIGN PATENTS 168,790   9/21   Great Britain.

ABRAHAM G. STONE, *Primary Examiner.*

RUSSELL R. KINSEY, T. GRAHAM CRAVER,
*Examiners.*